United States Patent [19]

Horiuchi et al.

[11] Patent Number: 4,572,344
[45] Date of Patent: Feb. 25, 1986

[54] CLUTCH DISK

[75] Inventors: Yusuke Horiuchi; Hisao Ootani, both of Toyota, Japan

[73] Assignee: Toyota Jidosha Kabushiki Kaisha, Toyota, Japan

[21] Appl. No.: 509,657

[22] Filed: Jun. 30, 1983

[30] Foreign Application Priority Data

Nov. 8, 1982 [JP] Japan ................... 57-167979

[51] Int. Cl.⁴ ............................................. F16D 47/02
[52] U.S. Cl. ................. 192/106.1; 192/70.17; 464/83; 464/85
[58] Field of Search ............ 192/106.1, 70.17; 464/82, 83, 85, 69, 89

[56] References Cited

U.S. PATENT DOCUMENTS

| 2,308,881 | 1/1943 | Jencick | 464/69 |
| 2,540,703 | 2/1951 | Wellaueo | 464/69 |
| 3,228,481 | 1/1966 | Eldred | 464/69 |
| 4,019,346 | 4/1977 | Fukuda | 464/69 |
| 4,266,409 | 5/1981 | Kutsch | 464/903 |

FOREIGN PATENT DOCUMENTS

| 518271 | 3/1921 | France | 192/55 |
| 1351 | 1/1977 | Japan | 464/69 |

Primary Examiner—Craig R. Feinberg
Assistant Examiner—David A. Okonsky
Attorney, Agent, or Firm—Oblon, Fisher, Spivak, McClelland & Maier

[57] ABSTRACT

A clutch disk of the type having a hub and a clutch plate operatively connected by at least two endless elastomer belts, each of which is entrained over a pair of bushings, one of which is mounted on a hub pin attached to the hub and the other of which is mounted on a plate pin attached to the clutch plate. Each of the bushings is defined by a semicylindrical side wall and a pair of flat side walls adjacent to the semicylindrical side wall and extending parallel to each other. Opposite belt runs of the elastomer belt act on the flat side walls of the bushing to forcibly rotate the bushing around the pin.

4 Claims, 8 Drawing Figures

CLUTCH DISK

BACKGROUND OF THE INVENTION

1. Field of the Invention

This invention relates to improvements in automotive clutch disks with elastomer belts for damping torsional shock.

2. Discussion of the Background

U.S. Pat. No. 4,266,409 discloses an energy-absorbing torque transmitter comprising a hub member and a rim member connected by at least one oriented elastomer belt trained over hub and rim rollers. Upon the application of force to either the hub or rim members, the belt is stretched to permit relative rotation of the hub member with respect to the rim member such as to absorb any sudden power surges from the engine while torque is being transferred from one member to the other.

Based on similar principles, a clutch disk has recently been developed in which a hub and a clutch plate are operatively connected by at least two endless elastomer belts, each of the belts being entrained over a pair of bushings one of which is rotatably mounted on a hub pin attached to the hub and the other of which is rotatably mounted on a plate pin attached to the clutch plate. Clutch disks of the type described are advantageous in that the amount of differential rotation permitted between the hub and clutch plate is considerably increased as compared with conventional clutch disks having torsion rubbers or springs due to the fact that the stretching ratio of elastomer belts can be considerably greater than the compression ratio of torsion rubbers or springs.

In clutch disks of this kind, it is important that the bushings be able to rotate smoothly about respective pins. If the smooth rotation of bushings is hindered for any reason, the tension at the two opposite beltruns of elastomer belt becomes unbalanced as the clutch plate displaces angularly with respect to the hub. This causes the belt to slip over the bushings, thereby resulting in unusual wear of the elastomer belt. Furthermore, as the force of sliding friction between the inner surface of the belt and the outer surface of the bushing is not constant, slippage of the elastomer belt causes the torsional hysteresis of the clutch disk to be unstable. To overcome this problem, the earlier developed clutch disk mentioned above employs antifriction bearings such as needle bearings between the bushings and their pins. The provision of antifriction bearings renders the clutch disk structure complex, increases the production costs, and also leads to the problem of bearing lubrication.

SUMMARY OF THE INVENTION

The object of the invention is to overcome the above-mentioned shortcomings and to provide a clutch disk of the type described which is simple in construction, can be manufactured at low cost, and yet is free from the problems of belt wear and unstable torsional hysteresis.

This invention provides a clutch disk of the type in which a hub and a clutch plate are operatively connected by at least two endless elastomer belts, each of which is entrained over a pair of bushings, one of which is rotatably mounted on a hub pin attached to the hub and the other of which is rotatably mounted on a plate pin attached to the clutch plate. According to the invention, each of the bushings has a semicylindrical side wall and a pair of flat walls adjacent to the semicylindrical side wall and extending parallel to each other.

With this arrangement, the belt runs of the elastomer belt laterally grip the flat side walls of the bushing, causing it to forcibly rotate around the pin when the clutch plate effects angular displacement with respect to the hub. Thus, no slipping takes place between the belt and bushings.

It is advantageous to provide a flange at one lateral end of the bushing to prevent the belt from slipping off the bushing.

It is preferable to arrange each pair of bushings such that the flange of one of the bushings is disposed in a staggered relationship with respect to the flange of the other bushing in order to facilitate assembly of the clutch disk.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
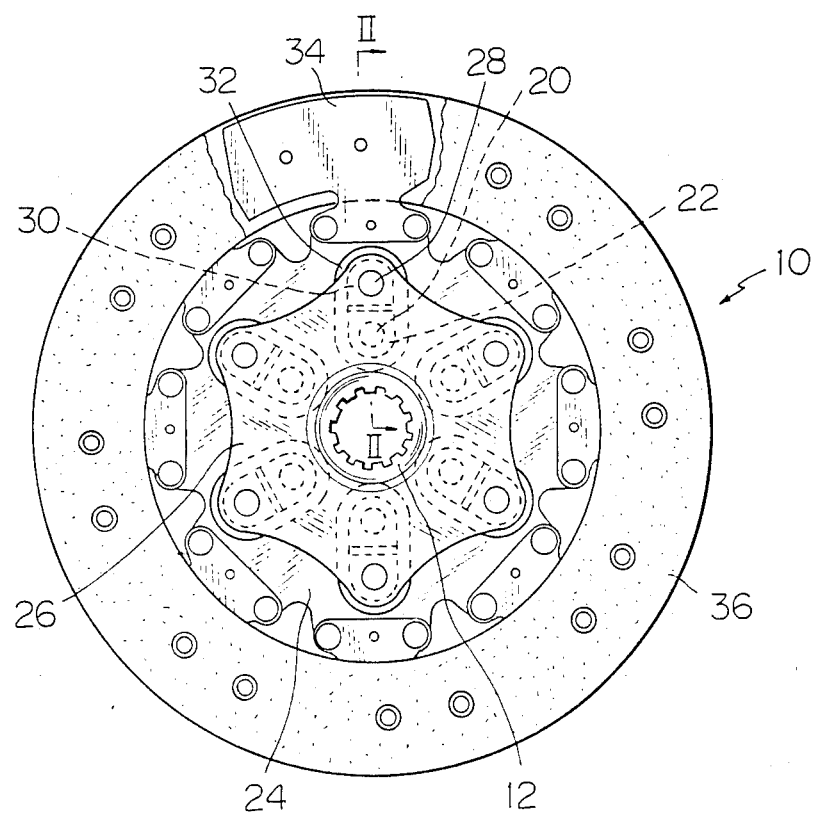
FIG. 1 is a front elevational view, partly cut away, of the clutch disk according to the invention.
Figure 2:
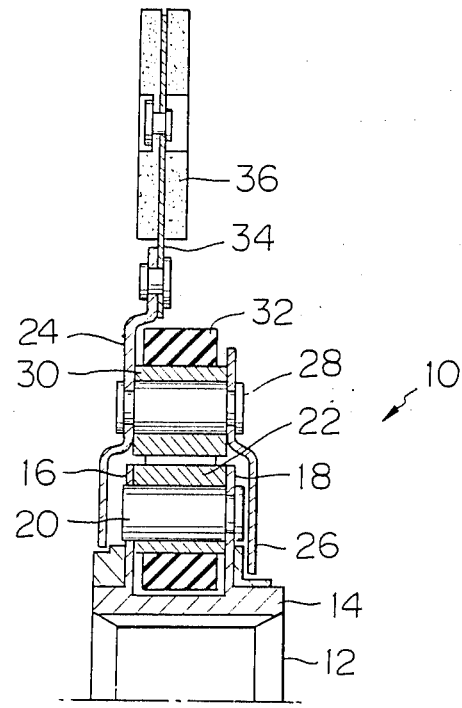
FIG. 2 is a cross-sectional view taken along line II—II in FIG. 1.

The features of the present invention as well as the object thereof will be more readily understood from the following description. Referring to FIGS. 1 and 2, the clutch disk 10 includes a hub 12 having a splined boss 14 and a pair of integral hub flanges 16 and 18. A plurality of circumferentially arranged hub pins 20, numbering six in all in the illustrated example, are secured by caulking to the hub flanges 16 and 18. Each hub pin 20 rotatably carries a hub pin bushing 22 which is preferably made of a fiber-reinforced plastic material blended with polytetrafluoroethylene powder.

A clutch plate 24 and a sub-plate 26 are mounted around the hub 12 leaving a small gap for relative rotation with respect thereto. The clutch plate 24 and sub-plate 26 are rigidly connected to each other by a plurality of plate pins 28 arranged circumferentially at an equal angular distance with each other. As shown in FIG. 2, each plate pin 28 has an enlarged central portion defining a shoulder abutting against the clutch plate 24 and sub-plate 26 to keep these apart a predetermined distance. The ends of the plate pins 28 are crimped. A plate pin bushing 30 similar to bushing 22 is mounted rotatably on each plate pin 28. An endless belt 32 of elastomer is passed over each pair of plate pin bushings and associated hub pin bushings.

As in conventional clutch disks, the clutch plate 24 is provided with a plurality of cushion springs 34 to which friction facings 36 are riveted.

Figure 3:
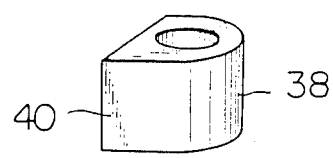
FIG. 3 is a perspective view of a bushing.

As shown in FIG. 3, each of bushings 22 and 30 has a semicylindrical side wall 38 and a pair of parallel flat side walls contiguous thereto, one of which is shown as 40.

Operation of the clutch disk according to the invention will be described in contrast to the operation of earlier developed clutch disks with reference to FIGS. 4, 5A, and 5B.

Figure 4:
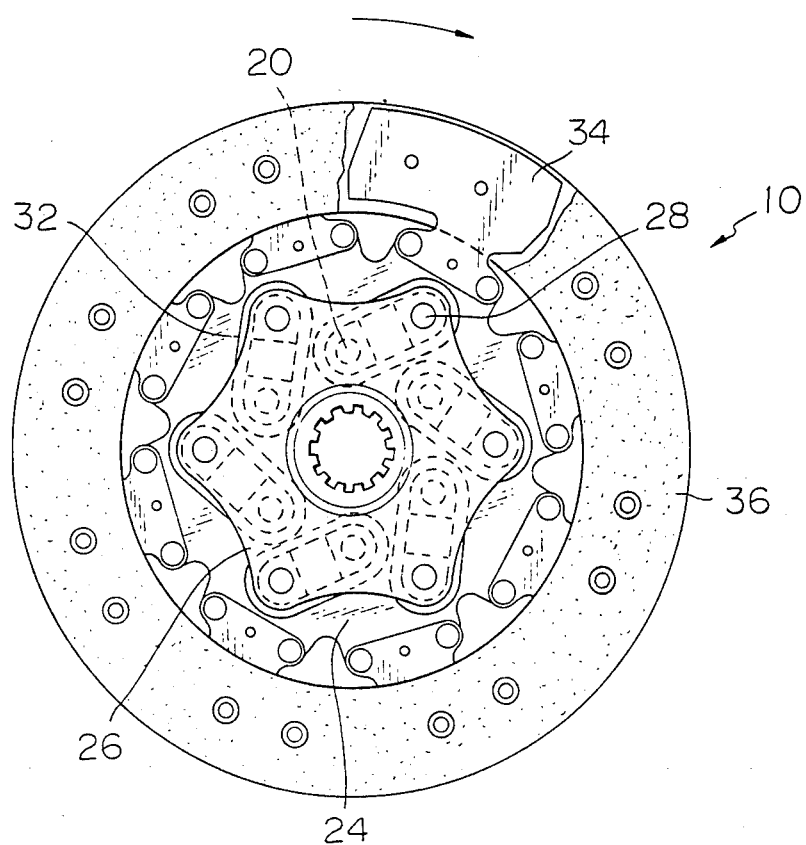
FIG. 4 is a view similar to FIG. 1 but showing a displaced position in which the belts are inclined and stretched as a result of the relative rotation of the clutch plate with respect to the hub.

Referring to FIG. 4, as a torque is applied to the clutch facing in the direction of the arrow, the clutch plate displaces angularly with respect to the hub as shown such that the plate pins 28 mounted on the clutch plate move away from the corresponding hub pins 20 mounted on the hub to stretch the belts passed over the bushings. The amount of stretching of the belts varies depending on changes in the torque, causing the belts to absorb shock due to power pulses from the engine and the like while transmitting torque to the hub.

Figure 5A:
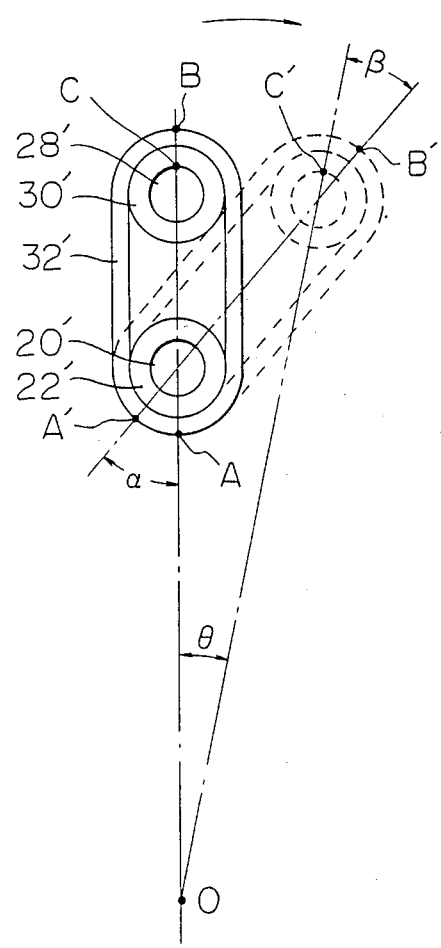
FIG. 5A is a schematic representation showing the initial and the stretched positions of the belt in the earlier developed clutch disk.
Figure 5:
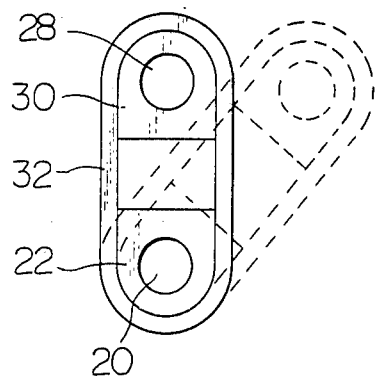
FIG. 5B is a schematic representation similar to FIG. 5A but showing the initial and the stretched positions of the belt in the clutch disk according to the invention.

Referring to FIG. 5A wherein the arrangement in the earlier developed clutch disk is shown, both bushings 22' and 30' are made in the form of rollers. Assuming that the clutch plate, as shown in FIGS. 1 and 2, angularly displaces about the center 0 of the disk through an angle $\theta$ with respect to the hub such that the belt 32' stretches into the position shown by the imaginary line, and also assuming that no slippage occurs between the belt 32' and the bushings 22' and 30', the latter rotating freely about respective pins 20' and 28', the point A on the belt will swing through an angle $\alpha$ about the axis of the hub pin 20' to move to point A'. If the belt 32' fits tightly on, and rotates together with, the bushing 22', the above movement of the belt will cause the bushing 22' to rotate through an angle $\alpha$ about the hub pin 20'. Point B on the belt will move to point B' but the plate pin 28' itself will rotate through angle $\theta$ about the center 0 so that the resulting rotational angle of the plate pin bushing 30' with respect to the plate pin 28' will be an angle $\beta$, which is equal to $\alpha$ minus $\theta$. In summary, the angles of rotation of bushings 22' and 28' with respect to their associated pins are a $\alpha$ and $\beta$, respectively.

If, on the other hand, the bushing 22' and 28' stick to their respective pins during relative rotation of the clutch plate through the angle $\theta$ with respect to the hub, as seen in FIG. 5A, the left-hand beltrun of the belt will stretch more than the right-hand beltrun, thereby developing different tensions on the respective beltruns. Such differential tension will cause the belt either to slip through the angle $\alpha$ over the bushing 22' in the first place and through the angle $\beta$ over the bushing 28' in the second place, or to slip through a total angle $\theta$ over any one of the busings 22' and 28'. Thus, it is necessary to provide antifriction bearings between the bushings and pins.

In contrast, in the clutch disk according to the present invention, the opposite beltruns of the belt grip the side walls of the bushings from both lateral sides so that the bushings are positively rotated about respective pins as the belt is stretched and inclined, as shown in FIG. 5B. Therefore, any undesirable belt slippage can be avoided without resorting to expensive antifriction bearings.

Figure 6:
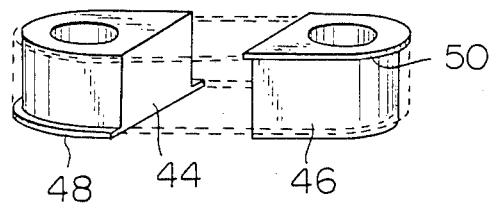
FIG. 6 is a perspective view showing a preferred form of the bushings as well as a preferred arrangement thereof.

FIG. 6 illustrates a modified form of bushing. In this embodiment, bushings 44 and 46 are provided with flanges 48 and 50 at one lateral end thereof to prevent the belt from slipping therefrom. The bushings may be arranged with the flange of one bushing positioned in a staggered manner with respect to the flange of the other bushing as shown. During the assembly of the clutch disk, one of the bushings may first be mounted on an associated pin and a belt then passed over this first bushing. The other bushing may then be slipped under the belt from the flangeless lateral end. This staggered arrangement of the bushings facilitates clutch disk assembly.

Figure 7:
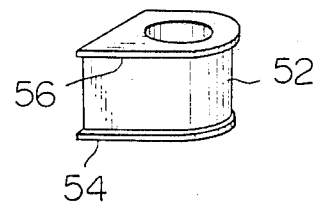
FIG. 7 is a perspective view of another modified form of the bushing.

FIG. 7 shows another modified form of the bushing in which the bushing 52 is provided with flanges 54 and 56 at both lateral ends.

Obviously, numerous modifications and variations of the present invention are possible in light of the above teachings. It is therefore to be understood that within the scope of the appended claims, the invention may be practiced otherwise than as specifically described herein.

We claim:

1. A clutch disk having a hub and a clutch plate which are operatively connected by at least two endless elastomer belts each of which is entrained over a pair of separate bushings, wherein one of said separate bushings is rotatably mounted on a hub pin attached to the hub and the remaining one of said pair of separate bushings is rotatably mounted on a plate pin attached to the clutch plate, and wherein each of said separate bushings has a semicylindrical side wall and a pair of flat side walls adjacent to said semicylindrical side wall and extending parallel to each other, said side wall and said flat sides contacting one of said belts.

2. A clutch disk according to claim 1, wherein each of said separate bushings has a flange at a lateral end thereof to prevent the elastomer belt from slipping off therefrom.

3. A clutch disk according to claim 2, wherein said pair of separate bushings are mounted such that the flange of one of said separate bushings is disposed in a staggered relationship with respect to the flange of the remaining bushing.

4. A clutch disk according to claim 1, wherein each of said separate bushings of said pair has flanges at a lateral end thereof.

* * * * *